US012372251B2

(12) United States Patent
Ceron

(10) Patent No.: US 12,372,251 B2
(45) Date of Patent: Jul. 29, 2025

(54) LIGHTING ASSEMBLY FOR A COOKING APPLIANCE

(71) Applicant: WHIRLPOOL CORPORATION, Benton Harbor, MI (US)

(72) Inventor: Simone E. Ceron, Busto Arsizio (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 219 days.

(21) Appl. No.: 17/968,101

(22) Filed: Oct. 18, 2022

(65) Prior Publication Data

US 2023/0136971 A1 May 4, 2023

Related U.S. Application Data

(60) Provisional application No. 63/273,229, filed on Oct. 29, 2021.

(51) Int. Cl.

| | |
|---|---|
| ***F24C 15/00*** | (2006.01) |
| ***F21V 3/02*** | (2006.01) |
| *F21W 131/307* | (2006.01) |
| *F21Y 115/10* | (2016.01) |

(52) U.S. Cl.

CPC .............. *F24C 15/008* (2013.01); *F21V 3/02* (2013.01); *F21W 2131/307* (2013.01); *F21Y 2115/10* (2016.08)

(58) Field of Classification Search

CPC ...... F24C 15/008; F21V 3/02; F21Y 2115/10; F21W 2131/307

USPC .......................................................... 362/154

See application file for complete search history.

(56) References Cited

U.S. PATENT DOCUMENTS

| | | | |
|---|---|---|---|
| 9,261,281 | B2 | 2/2016 | Reinhard-Herrscher et al. |
| 9,482,436 | B1 | 11/2016 | Hettinger et al. |
| 9,528,709 | B2 | 12/2016 | Hettinger et al. |
| 9,615,676 | B2 | 4/2017 | Clark et al. |
| 10,151,495 | B2 | 12/2018 | Baumeister et al. |

(Continued)

FOREIGN PATENT DOCUMENTS

| | | | |
|---|---|---|---|
| DE | 8518078 | U1 | 8/1985 |
| EP | 2302304 | A1 | 3/2011 |

(Continued)

OTHER PUBLICATIONS

English translation of EP 2746674 A1 (Year: 2014).*
English translation of EP 2746675 A1 (Year: 2014).*

*Primary Examiner* — James R Greece
*Assistant Examiner* — Hana S Featherly
(74) *Attorney, Agent, or Firm* — Price Heneveld LLP

(57) ABSTRACT

A cooking appliance includes a cabinet that defines a cooking cavity and an opening to allow access to the cooking cavity. The cabinet including a top wall and a back wall. The back wall is opposite the opening and connects with the top wall at an upper portion of the back wall. The back wall has a back surface facing the cooking cavity and has a planar shape. An indentation is defined by the back wall and extends away from the cooking cavity. The indentation has an elongated shape along a width-wise direction of the cooking cavity at the upper portion. A support surface is formed by the indentation and recessed relative to the back surface. A lighting assembly is disposed in the indentation and coupled to the support surface. The lighting assembly is configured to direct light toward a central portion of the cooking cavity.

19 Claims, 7 Drawing Sheets

(56) References Cited

U.S. PATENT DOCUMENTS

| | | | |
|---|---|---|---|
| 10,962,231 B2 | 3/2021 | Signorino et al. | |
| 2012/0170247 A1 | 7/2012 | Do | |
| 2015/0345856 A1 | 12/2015 | Ferreira et al. | |
| 2018/0324907 A1 * | 11/2018 | Bär | F24C 15/008 |
| 2019/0107290 A1 | 4/2019 | Signorino et al. | |
| 2019/0234618 A1 | 8/2019 | Reinhard-Herrscher et al. | |

FOREIGN PATENT DOCUMENTS

| | | | |
|---|---|---|---|
| EP | 2746674 A1 * | 6/2014 | F24C 15/008 |
| EP | 2746675 A1 * | 6/2014 | F24C 15/008 |

* cited by examiner

LIGHTING ASSEMBLY FOR A COOKING APPLIANCE

CROSS-REFERENCE TO RELATED APPLICATIONS

This application claims priority to U.S. Patent Application No. 63/273,229, filed on Oct. 29, 2021, entitled "LIGHTING ASSEMBLY FOR A COOKING APPLIANCE," the disclosure to which is hereby incorporated herein by reference in its entirety.

FIELD OF THE DISCLOSURE

The present disclosure generally relates to cooking appliances. More specifically, the present disclosure relates to a lighting assembly for a cooking appliance.

BACKGROUND OF THE DISCLOSURE

A cooking appliance includes a housing for receiving food items to be cooked. A lighting device is disposed in the housing for illuminating the housing. Conventional lighting devices may be positioned to shine light throughout the housing, including toward an opening of the housing, which can produce light glare and dazzle users of the cooking appliance.

SUMMARY OF THE DISCLOSURE

According to one aspect of the present disclosure, a cooking appliance includes a cabinet that defines a cooking cavity and an opening to allow access to the cooking cavity. The cabinet includes a top wall and a back wall. The back wall is opposite the opening and connects with the top wall at an upper portion of the back wall. The back wall has a back surface that faces the cooking cavity and has a planar shape. An indentation is defined by the back wall and extends away from the cooking cavity. The indentation has an elongated shape along a width-wise direction of the cooking cavity at the upper portion. A support surface is formed by the indentation and recessed relative to the back surface. A lighting assembly is disposed in the indentation and coupled to the support surface. The lighting assembly is configured to direct light toward a central portion of the cooking cavity.

According to another aspect of the present disclosure, a cooking appliance includes a cabinet defined by a cooking cavity and an opening to allow access to the cooking cavity. A back wall is disposed opposite the opening and extends between an upper portion connecting to a top wall of the cabinet and a lower portion connecting to a bottom wall of the cabinet. A lighting assembly is coupled to the back wall adjacent one of the upper portion and the lower portion and is configured to direct light at an acute angle relative to the back wall into a central portion of the cooking cavity.

According to yet another aspect of the present disclosure, a cooking appliance includes a cabinet defined by a cooking cavity and an opening to allow access to the cooking cavity. The cabinet includes a top wall and a back wall. The back wall is opposite the opening and connects with the top wall at an upper portion of the back wall. The back wall has a back surface that faces the cooking cavity and has a planar shape. An indentation is defined by the back wall and extends away from the cooking cavity. The indentation has an elongate shape along a width-wise direction of the cooking cavity at the upper portion. A support surface is formed by the indentation and recessed relative to the back surface. A lighting assembly is disposed in the indentation and coupled to the support surface. The support surface extends at a first oblique angle relative to the back surface. The lighting assembly is configured to project light at a second oblique angle relative to the back surface. The first oblique angle and the second oblique angle are complementary angles.

These and other features, advantages, and objects of the present disclosure will be further understood and appreciated by those skilled in the art by reference to the following specification, claims, and appended drawings.

Figure 1:
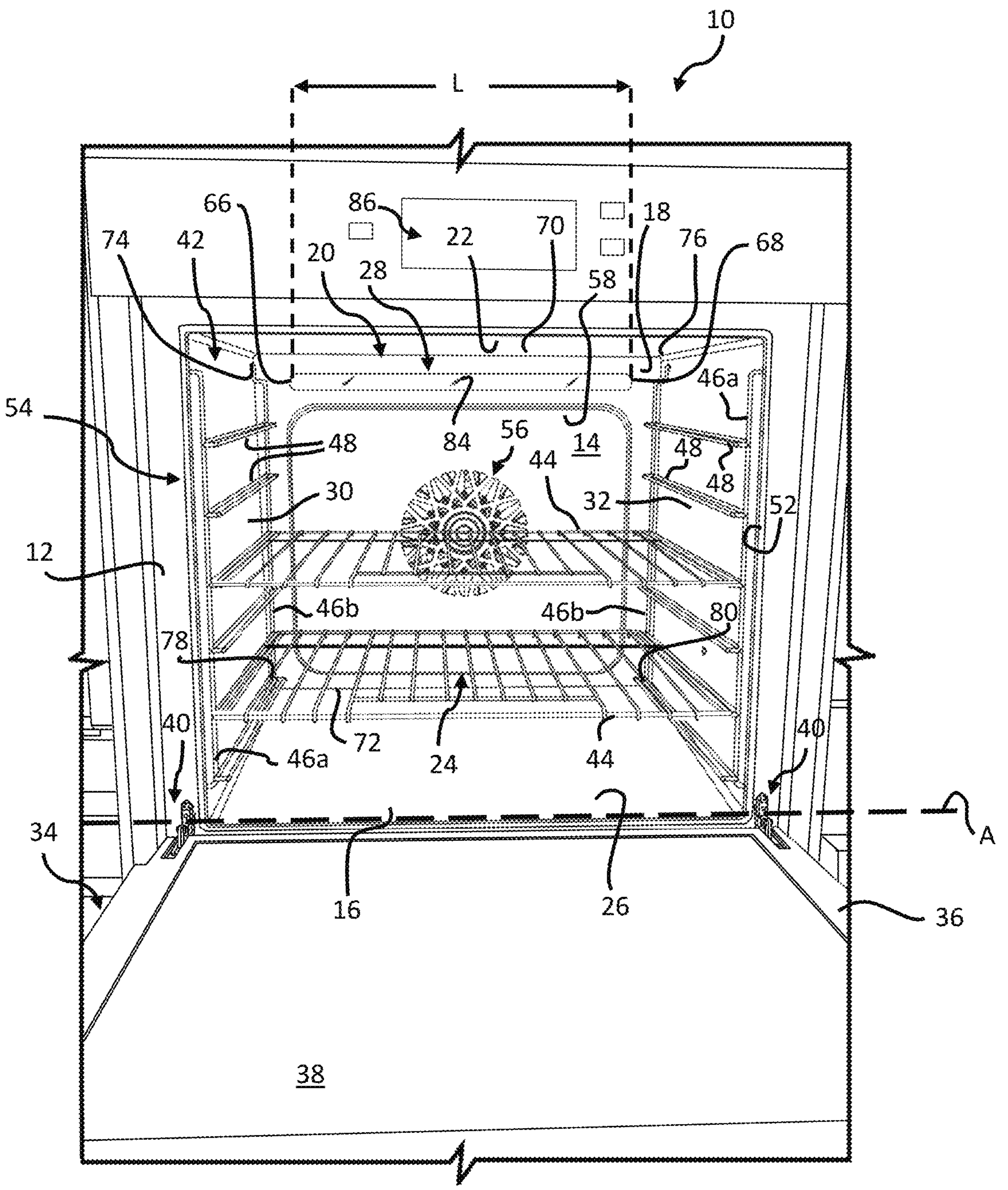
FIG. 1 is a front perspective view of a cooking appliance according to one aspect of the disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a lighting assembly for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
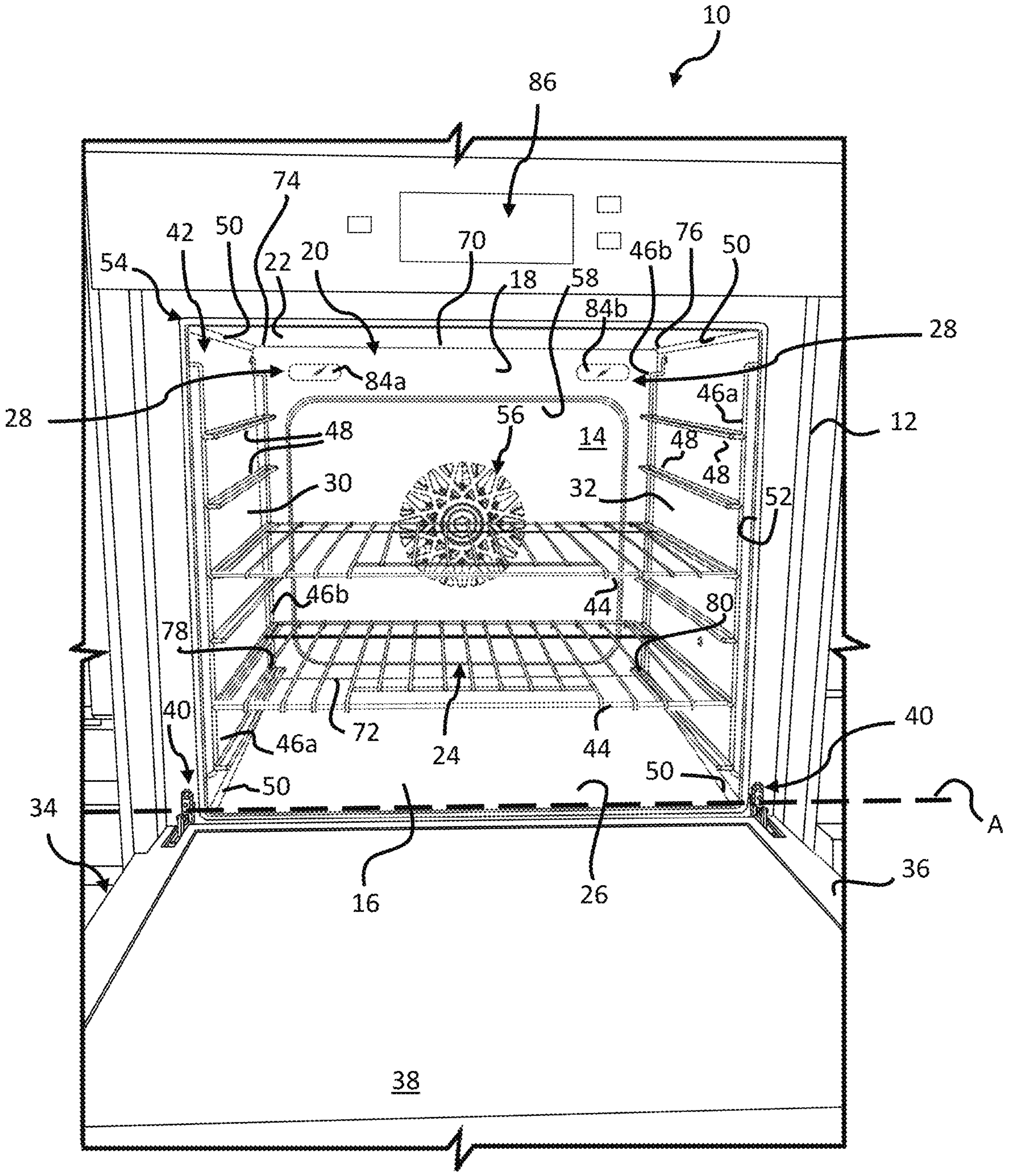
FIG. 2 is a front perspective view of a cooking appliance according to one aspect of the disclosure.
Figure 3:
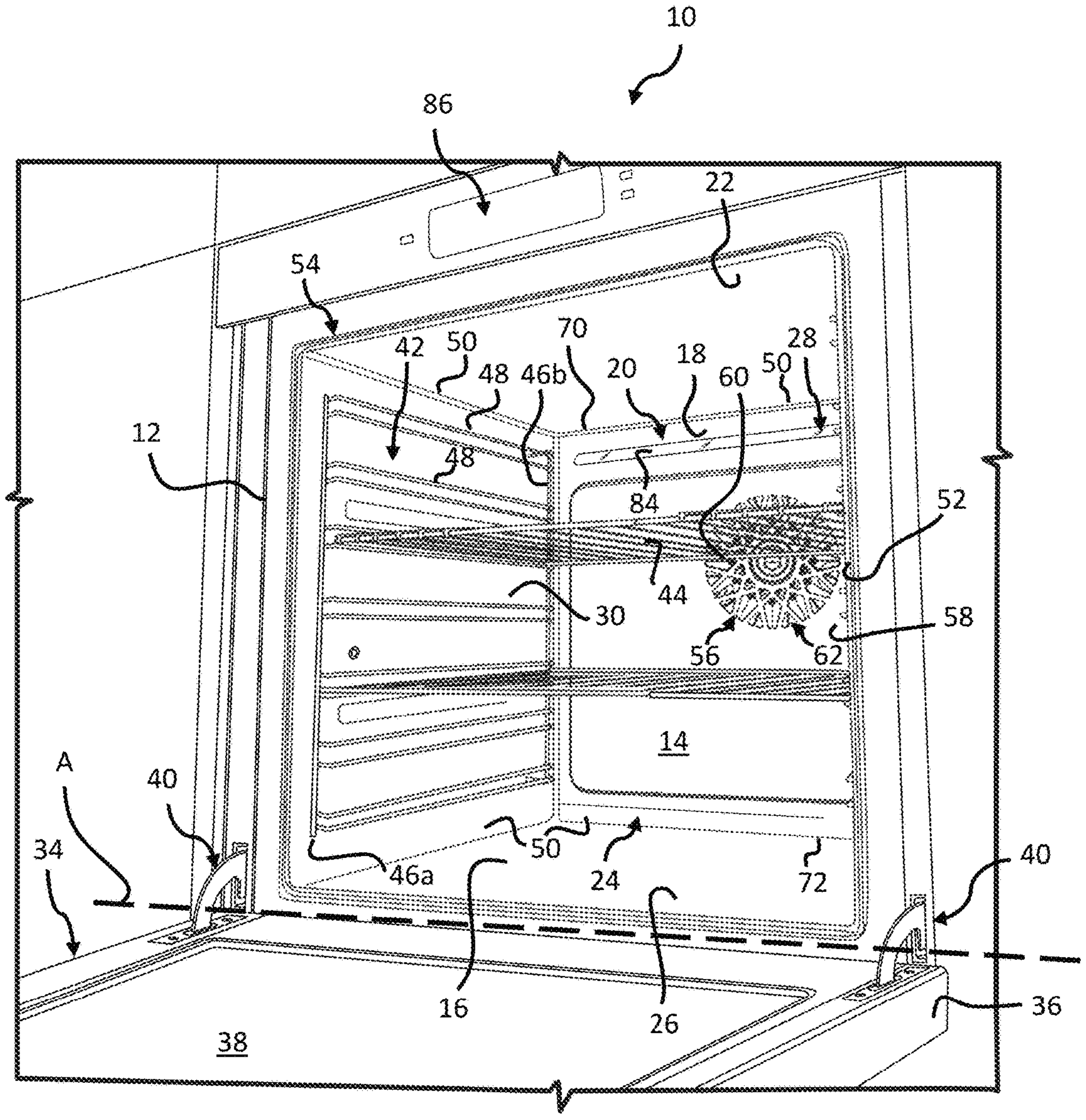
FIG. 3 is a front perspective view of a cooking appliance according to one aspect of the disclosure.
Figure 4:
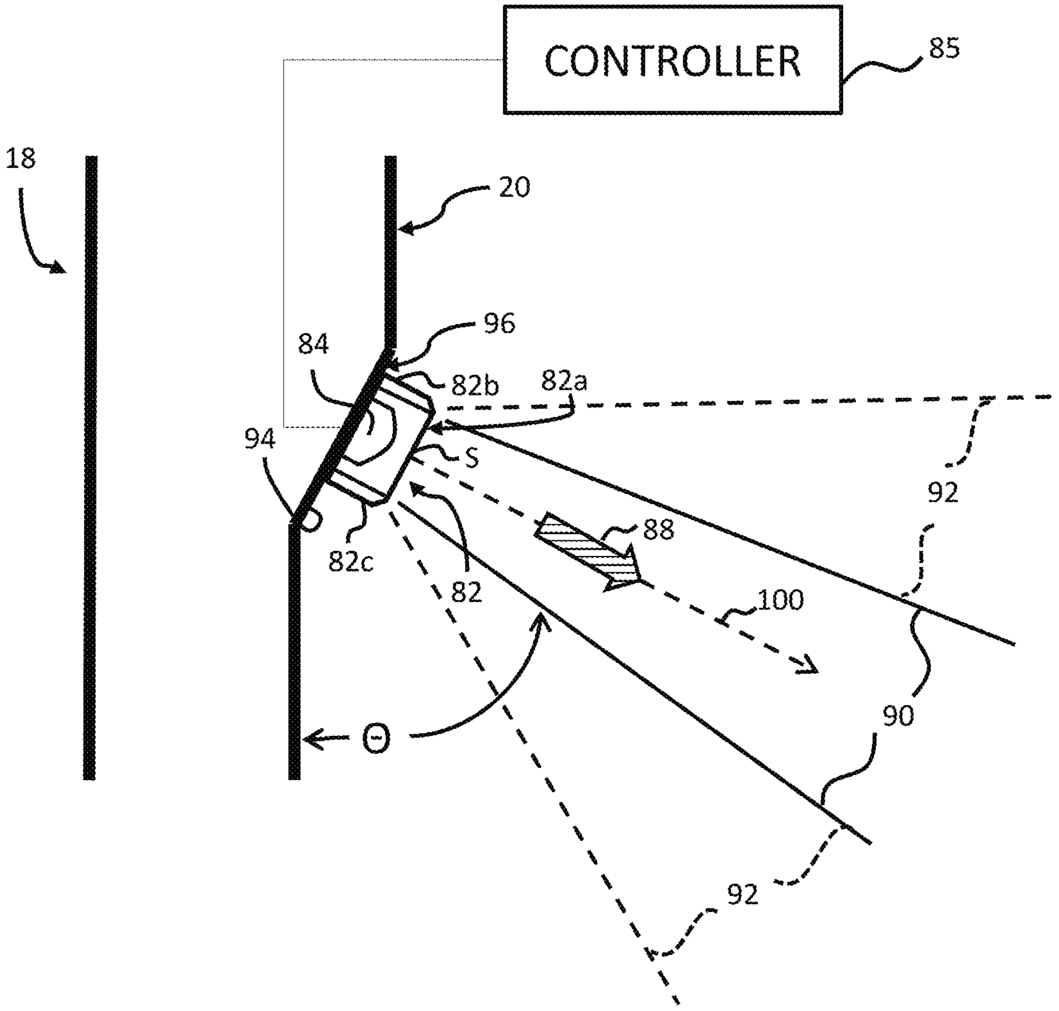
FIG. 4 is a cross-sectional view of a portion of a wall of the cooking appliance according to one aspect of the disclosure.

Referring to FIGS. 1-3, reference numeral 10 generally designates a cooking appliance that includes a cabinet 12 defining a cooking cavity 14. The cooking appliance 10 also defines an opening 16 to allow access to the cooking cavity 14. The cabinet 12 includes a back wall 18 disposed opposite the opening 16. The back wall 18 extends between an upper portion 20 connecting to a top wall 22 of the cabinet 12 and a lower portion 24 connecting to a bottom wall 26 of the cabinet 12. A lighting assembly 28 is coupled to the back wall 18 adjacent one of the upper portion 20 and the lower portion 24. The lighting assembly 28 is configured to direct light at an acute angle relative to the back wall 18 into a central portion of the cooking cavity 14.

It is generally contemplated that the cooking appliance 10 may be a conventional oven, such as a convection oven, or may be one of a variety of appliances, including a microwave oven. The top wall 22 is spaced from the bottom wall 26 by first and second side walls 30, 32. A door assembly 34 pivotally connects with the cabinet 12 for selectively covering the opening 16. According to aspects of the disclosure, the door assembly 34 may rotate about a pivot axis A disposed adjacent the bottom wall 26 and orthogonal to the first side wall 30 and the second side wall 32. It is generally contemplated that the walls 22, 26, 30, 32 may include a coating (e.g., an acrylic enamel coating or a ceramic coating) to provide ease of cleaning and/or a desired aesthetic appearance to the cooking cavity 14. Additionally, or alternatively, the coating may be a substantially non-stick coating (e.g., polytetrafluoroethylene (PTFE) or ceramic).

As illustrated in FIGS. 1-3, the door assembly 34 includes a door frame 36 and a viewing panel 38. The viewing panel 38 is coupled to, and held in place by, the door frame 36. The viewing panel 38 may be at least partially optically transmissive to allow a user of the cooking appliance 10 to view into the cooking cavity 14 before, during, or after operation of the cooking appliance 10. The viewing panel 38 may be made of glass, a polymer, or some other durable and/or transparent material. The cooking appliance 10 may include a connection assembly 40 for connecting the door assembly 34 with the cabinet 12 and aligning the door assembly 34 during a movement between an open position and a closed position.

A ladder rack assembly 42 includes one or more horizontal racks 44 and one or more vertical rails 46*a*, 46*b* coupled to at least one of the first side wall 30 and the second side wall 32. One or more lateral rails 48 may be configured to attach to at least a portion of the vertical rails 46*a*, 46*b* and support the one or more horizontal racks 44 in the central portion of the cooking cavity 14. The ladder rack assembly 42 may be configured to receive a cooking tray on which items of food may be supported. Further, a plurality of cooking trays may be supported by the ladder rack assembly 42. The one or more vertical rails 46*a*, 46*b* includes a forward vertical rail 46*a* disposed proximate to the opening 16 of the cooking cavity 14 and a rearward vertical rail 46*b* is disposed proximate the back wall 18 of the cooking cavity 14. The one or more horizontal racks 44 are coupled to the vertical rails 46*a*, 46*b* via the one or more lateral rails 48. The ladder rack assembly 42 is configured to couple to the first side wall 30. Corresponding vertical rails 46*a*, 46*b* are coupled to the second side wall 32 such that the cooking tray is supported on each side. The second side wall 32 and the corresponding ladder rack assembly 42 may include similar or identical characteristics as those described herein with respect to the first side wall 30 and the ladder rack assembly 42. The corresponding ladder rack assembly 42 may be substantially symmetrical to the ladder rack assembly 42 such that the corresponding ladder rack assembly 42 is a mirror image of the ladder rack assembly 42. It is contemplated that the corresponding ladder rack assembly 42 may be substantially similar in all or some other aspects.

The cooking cavity 14 may include a fillet 50 that couples the first side wall 30 with the top wall 22, the second side wall 32 with the top wall 22, the first side wall 30 with the bottom wall 26, and the second side wall 32 with the bottom wall 26. Each fillet 50 may help to prevent arcing and/or reduce stress concentrations within the cooking cavity 14. The cooking cavity 14 may further include a rounded periphery 52 along a front portion 54 of the cooking cavity 14. The rounded periphery 52 may help to provide a better seal between the front surface of the rounded periphery 52 when the door assembly 34 is in a closed position. The ladder rack assembly 42 may include any of a variety of materials. For example, one or more of the vertical rails 46*a*, 46*b*, the horizontal racks 44, and may include a metal (e.g., steel or stainless steel), a metal with a ceramic overlay, and/or a chrome plated steel or a stainless steel (for use with ovens that include pure steam functionality).

Referring again to FIGS. 1-3, a convection fan 56 may be concealed behind a baffle cover 58 extending from the back wall 18 into the cooking cavity 14. During operation of the convection fan 56, movement of cavity air within the cooking cavity 14 generates a high pressure space 60 between the baffle cover 58 and the back surface of the cooking cavity 14. To assist in forming this high pressure space 60, the baffle cover 58 defines a plurality of vent apertures 62 that cooperate with the convection fan 56 to generate the high pressure space 60 that directs the cavity air from the cooking cavity 14.

As exemplarily illustrated in FIGS. 1-3, a lighting assembly 28 is coupled to the back wall 18 adjacent the upper portion 20 and is configured to project light into the cooking cavity 14. Although the lighting assembly 28 is shown disposed adjacent the upper portion 20, it should be appreciated that the lighting assembly 28 can, additionally or alternatively, be coupled to the upper portion 20. The lighting assembly 28 may be disposed above the ladder rack assembly 42 and have a substantially elongated shape, as illustrated. The lighting assembly 28 may extend between a first end 66, disposed adjacent the first side wall 30, and a second end 68, disposed adjacent the second side wall 32. According to various aspects of the disclosure, the lighting assembly 28 may be disposed horizontally and have a length L substantially equal to a width of the baffle cover 58. Although the lighting assembly 28 is illustrated spaced from the top wall 22, it should be appreciated that the lighting assembly 28 may coincide with a first intersection 70 between the top wall 22 and the back wall 18 and/or a second intersection 72 between the bottom wall 26 and the back wall 18. Further, the first end 66 of the lighting assembly 28 may be disposed in or near a first corner 74 formed by the top wall 22, the back wall 18, and the first side wall 30, and the second end 68 of the lighting assembly 28 may be disposed in or near a second corner 76 formed by the top wall 22, the back wall 18, and the second side wall 32. Additionally or alternatively, the lighting assembly 28 may be disposed in or near a third corner 78 formed by the bottom wall 26, the back wall 18, and the first side wall 30, and the second end 68 of the lighting assembly 28 may be disposed in or near a fourth corner 80 formed by the bottom wall 26, the back wall 18, and the second side wall 32. Additionally, or alternatively, the lighting assembly 28 may mount to the fillet 50 at an acute angle relative to the back wall 18, the top wall 22, the bottom wall 26, and/or the first and second side walls 30, 32.

The lighting assembly 28 may include a cover 82 made from a suitable heat resistant material (e.g., borosilicate glass, an opalescent material, etc.). The cover 82 may be optically translucent according to various aspects of the present disclosure. It should be appreciated that the cover 82 may be heat-treated to withstand high temperatures of the cooking cavity 14. The cover 82 may serve as a light guide to diffuse or otherwise affect light provided by the lighting assembly 28. Stated differently, the cover 82 may serve as a lens for the lighting assembly 28. The cover 82 may be removable for ease of cleaning the cover 82.

The cover 82 may include a light projection surface S configured to collimate light toward the central portion of the cooking cavity 14. The light projection surface S includes a planar extent 82*a* that extends at an acute angle relative to the back wall 18. The planar extent 82*a* may extend at least partially along the length L of the lighting assembly 28. Top and bottom side extents 82*b*, 82*c* may extend from the planar extent 82*a* toward the back wall 18 to connect the cover 82 with the back wall 18. The top and bottom side extents 82*b*, 82*c* may also be configured to direct light toward the central portion. Additionally or alternatively, the cover 82 may be curved between the top and bottom side extents 82*b*, 82*c*. A first end extent and a second end extent may extend between the top extent 82*b* and the bottom extent 82*c* and correspond with the first end 66 and the second end 68 of the lighting assembly 28, respectively. The lighting assembly 28 may include one or more light sources 84, such as light-emitting diodes (LEDs). The one or more LEDs may include an LED strip disposed within the elongated lighting assembly 28. A controller 85 may be configured to operate the LEDs to have one or more predetermined behaviors (e.g., blinking, changing colors, and changing brightness). The controller 85 may be in communication with, or may be the same as, the cooking appliance controller, and may be operable via an human-machine interface (HMI) 86 external to the cooking cavity 14. According to some aspects of the disclosure, the light source 84 may be in a traditional tube form (similar to fluorescent bulbs), such as an LED tube, having sockets disposed at the first end 66 and the second end 68 of the lighting assembly 28. The light source 84 may extend from adjacent the first side wall 30 to adjacent the second side wall 32. Additionally, or alternatively, the lighting assembly 28 may incorporate a light source 84 including strip-type LED strands.

According to an exemplary aspect of the disclosure shown in FIG. 2, the lighting assembly 28 may include a first light source 84*a* and a second light source 84*b*. The first light 84*a* source can be disposed adjacent an intersection of the back wall 18, the top wall 22, and the first side wall 30 of the cabinet (i.e., the first corner 74), and the second light source 84*b* can be disposed adjacent an intersection of the back wall 18, the top wall 22, and the second side wall 32 of the cabinet 12 (i.e., the second corner 76). According to some aspects of the present disclosure, a plurality of light sources 84 may be distributed along a width of the back wall 18 between the first side wall 30 and the second side wall 32. For example, the length L of the lighting assembly 28 may extend in a width-wise direction along the back wall 18. The back wall 18 may generally be planar in shape.

Referring now to FIGS. 4-7, the lighting assembly 28 is configured to project light, illustrated by arrow 88, at a projection angle Θ that is an acute angle relative to the back wall 18. The light may be directed toward the central portion of the cooking cavity 14. As previously discussed, the central portion may correspond to a location of the horizontal racks 44. For example, the lighting assembly 28 may be configured to project the light from the upper portion 20 of the back wall 18 toward the bottom wall 26 at an acute angle relative to the back wall 18 and onto the horizontal racks 44. The light may have a high-intensity range of light 90 and a low-intensity range of light 92, with the high-intensity range of light 90 focused on the central portion and the low-intensity range 92 dispersed throughout the cooking cavity 14. The lighting assembly 28 can thereby be configured to minimize glare and/or dazing light distributed at the opening 16.

Figure 5:
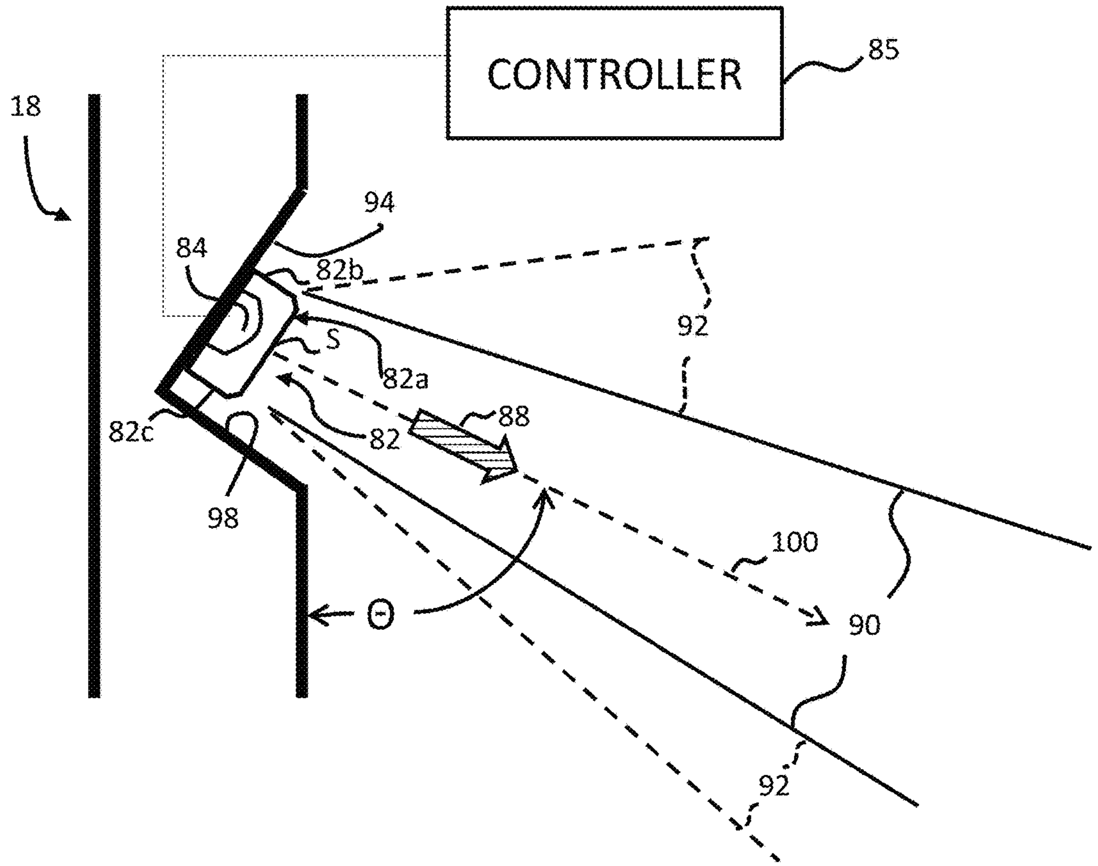
FIG. 5 is a cross-sectional view of a portion of a wall of the cooking appliance according to one aspect of the disclosure.
Figure 6:
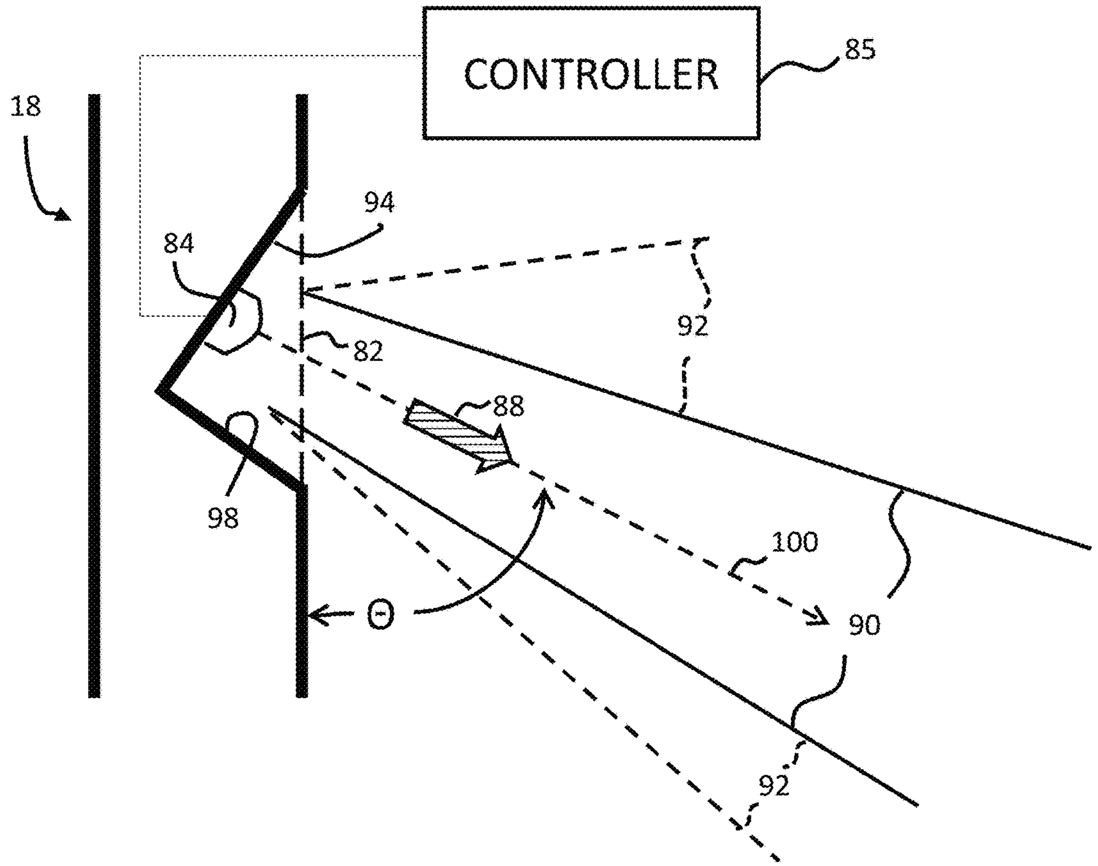
FIG. 6 is a cross-sectional view of a portion of a wall of the cooking appliance according to one aspect of the disclosure.

A support surface 94 can be disposed on the back wall 18 and extend at an acute angle relative to the back wall 18 of the cabinet 12. The support surface 94 may be recessed or protruding from a back surface of the back wall 18. The back surface may be the generally planar surface that is generally the rear-most portion of the cabinet 12. The lighting assembly 28 may be coupled to the support surface 94 and configured to project light normal to the support surface 94. As exemplarily illustrated in FIG. 4, the support surface 94 may be formed on a protrusion 96 extending from the back wall 18 into the cooking cavity 14. According to aspects of the disclosure, the cover 82 of the lighting assembly 28 may be flush with the support surface 94 and the light source 84 (and/or the first and second light sources 84*a*, 84*b*) may be disposed in a recess 98, or indentation, defined by and/or extending into the back wall 18 adjacent the support surface 94, as generally shown in FIG. 6. As illustrated in FIG. 5, the cover 82 of the lighting assembly 28 may also be housed within the recess 98. It should be appreciated that the acute angle at which the support surface 94 extends may complementarily relate to the projection angle Θ. For example, if the support surface 94 extends at an angle of 30 degrees relative to the back wall 18, then the projection angle Θ may be configured to project at an angle of 60 degrees relative to the back wall 18. More particularly, continuing with the non-limiting example, the high-intensity range of light 90 may have a center ray of light 100 projecting at an angle of 60 degrees relative to the back wall 18.

Figure 7:
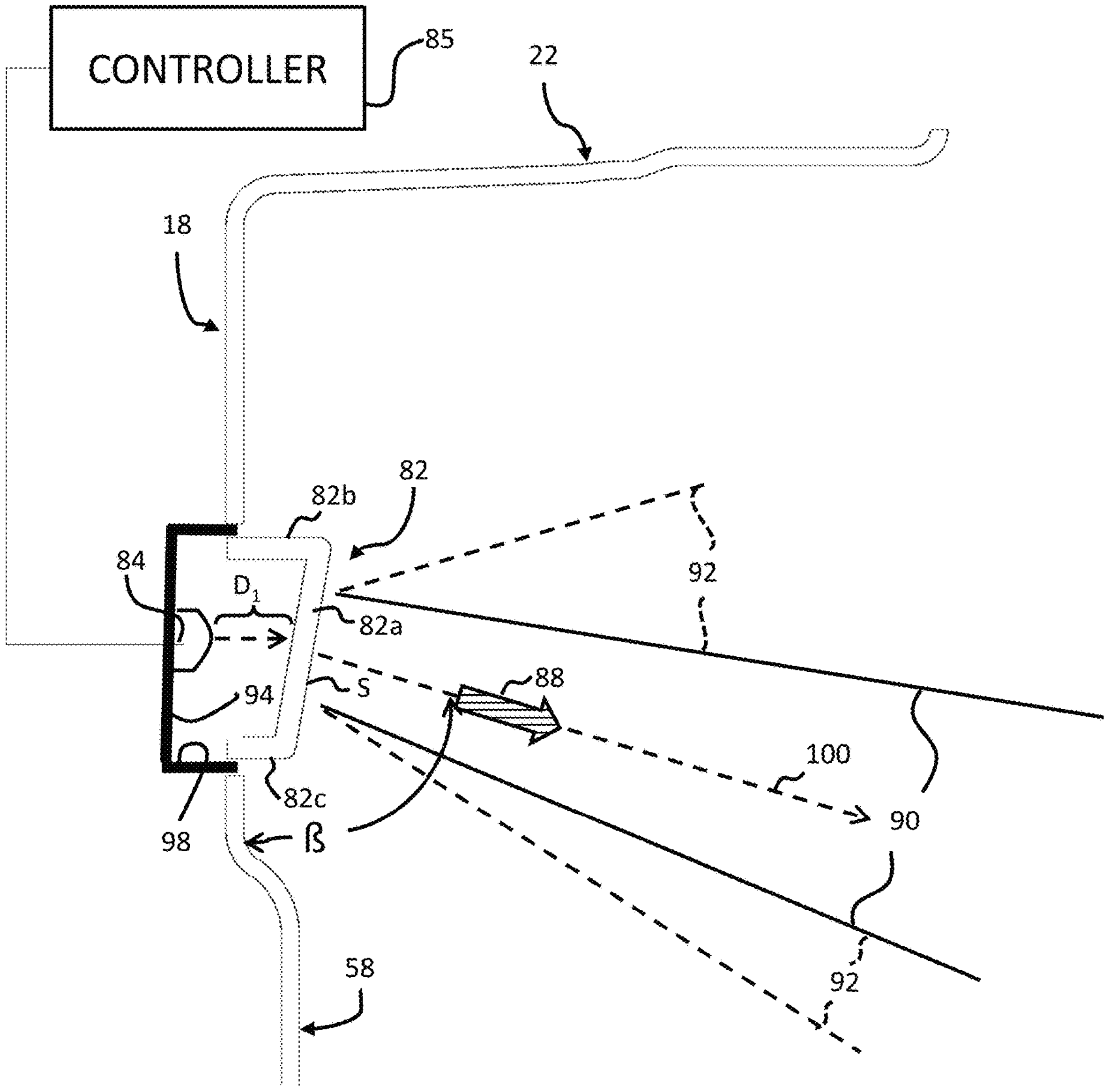
FIG. 7 is a cross-sectional view of a portion of a wall of the cooking appliance according to one aspect of the disclosure.

Referring more specifically to FIG. 7, the cover 82 may extend at an acute angle relative to the back wall 18 to direct the light from the light source 84 toward the central portion of the cooking cavity 14. More specifically, the light projection surface S may extend at an acute angle relative to the back wall 18. According to some aspects of the present disclosure, the center ray of light 100 may be configured to project generally perpendicular to the back wall 18 over a distance $D_1$ from the light source 84 to the cover 82. Further, the light source 84 (and/or the first and second light sources 84*a*, 84*b*) may be spaced from the cover and operable to direct the central ray of light 100 at an acute angle relative to the planar extent 82*a*. It is generally contemplated that one or both of the top and bottom side extents 82*b*, 82*c* may extend generally perpendicular to the back wall 18 and be at least partially disposed within the recess 98. The cover 82 may be operable to collimate the light about a focus angle β relative to the back wall 18. In this way, the projection angle Θ formed between the support surface 94 and the center ray of light 100 may be in the range of between 0 degrees (i.e. parallel) and 90 degrees relative to the back wall 18 while still providing focused light into/onto the central portion of the cooking cavity 14. Further, according to some aspects of the disclosure, the support surface 94 may be generally parallel to the back wall 18, or, alternatively, the acute angle formed by support surface 94 may be a different angle than the acute angle the cover 82 forms with the back wall 18. It is generally contemplated that the distance $D_1$ may influence the breadth of the high-intensity range of light 90 (e.g., a greater distance $D_1$ may reduce the breadth of the high-intensity range of light 90). The distance $D_1$ may be optimized to provide the desired breadth of the high-intensity range of light 90, such as in the range of between 45 and 90 degrees.

It will be contemplated from the present disclosure that, additionally or alternatively, the lighting assembly 28 can be configured to project light toward one or both of the side walls 30, 32 or the top wall 22. Stated differently, the lighting assembly 28 may be disposed on the lower portion 24 and be configured to project light at an acute angle upwardly toward the top wall 22, or the lighting assembly 28 may be generally vertically disposed adjacent one or both of the side walls 30, 32 and be configured to project light toward the opposing side wall. In these configurations, the high-intensity range of light 90 may be restrained from being directed toward the opening to reduce glare according to an observer outside of the cooking cavity 14 looking into the cooking cavity 14.

According to one aspect of the present disclosure, a cooking appliance includes a cabinet defining a cooking cavity and an opening to allow access to the cooking cavity. The cabinet includes a top wall and a back wall. The back wall is opposite the opening and connects with the top wall at an upper portion of the back wall. The back wall has a back surface facing the cooking cavity and has a planar shape. An indentation is defined by the back wall and extends away from the cooking cavity. The indentation has an elongate shape along a width-wise direction of the cooking cavity at the upper portion. A support surface is formed by the indentation and recessed relative to the back surface. A lighting assembly is disposed in the indentation and coupled to the support surface. The lighting assembly is configured to direct light toward a central portion of the cooking cavity.

According to some aspects of the present disclosure, the support surface extends at a first oblique angle relative to the back surface.

According to some aspects of the present disclosure, the lighting assembly is configured to project the light at a second oblique angle relative to the back surface. The first oblique angle and the second oblique angle are complementary angles.

According to some aspects of the present disclosure, the lighting assembly includes at least one light source and a cover disposed between the at least one light source and the central portion. The cover has a light projection surface configured to collimate the light toward the central portion of the cooking cavity.

According to some aspects of the present disclosure, the light projection surface is configured to direct a central ray of light toward the central portion.

According to some aspects of the present disclosure, the light includes a high-intensity range of light. The light projection surface is operable to limit the high-intensity range of light to between 45 and 90 degrees to limit light distribution toward the opening.

According to one aspect of the present disclosure, a cooking appliance includes a cabinet that defines a cooking cavity. The cabinet also defines an opening to allow access to the cooking cavity. A back wall is disposed opposite the opening and extends between an upper portion of the back wall and a lower portion of the back wall. The upper portion connects to a top wall of the cabinet and the lower portion connects to a bottom wall of the cabinet. A lighting assembly is coupled to the back wall adjacent one of the upper portion and the lower portion. The lighting assembly is configured to direct light at an acute angle relative to the back wall into a central portion of the cooking cavity.

According to some aspects of the present disclosure, the lighting assembly is adjacent the upper portion.

According to some aspects of the present disclosure, a support surface is disposed on the back wall. According to some aspects of the present disclosure, the support surface extends at an acute angle relative to the back wall of the cabinet. According to some aspects of the present disclosure, the lighting assembly is coupled to the support surface and configured to project the light normal to the support surface.

According to some aspects of the present disclosure, a protrusion extends from the back wall into the cooking cavity. According to some aspects of the present disclosure, the protrusion forms the support surface.

According to some aspects of the present disclosure, the back wall defines a recess extending away from the cooking cavity. According to some aspects of the present disclosure, the recess forms the support surface.

According to some aspects of the present disclosure, the lighting assembly includes at least one light source extending from adjacent a first side wall of the cabinet to adjacent a second side wall of the cabinet.

According to some aspects of the present disclosure, the at least one light source includes a plurality of light sources distributed along a width of the back wall between the first side wall and the second side wall.

According to some aspects of the present disclosure, the at least one light source includes a first light source and a second light source. According to some aspects of the present disclosure, the first light source is disposed adjacent an intersection of the back wall, the top wall, and a first side wall of the cabinet. According to some aspects of the present disclosure, the second light source is disposed adjacent an intersection of the back wall, the top wall, and a second side wall of the cabinet.

According to some aspects of the present disclosure, the lighting assembly includes a light-emitting diode (LED).

According to some aspects of the present disclosure, the lighting assembly includes a cover having a light projection surface. According to some aspects of the present disclosure, the light projection surface includes a planar extent that extends at an acute angle relative to the back wall and is configured to collimate the light toward the central portion of the cooking cavity.

According to some aspects of the present disclosure, the lighting assembly includes a light source spaced from the cover and operable to direct a central ray of light at an acute angle relative to the planar extent.

According to another aspect of the present disclosure, a cooking appliance includes a cabinet defining a cooking cavity and an opening to allow access to the cooking cavity. The cabinet includes a top wall and a back wall. The back wall is opposite the opening and connects with the top wall at an upper portion of the back wall. The back wall has a back surface facing the cooking cavity and having a planar shape. An indentation defined by the back wall and extending away from the cooking cavity, the indentation having an elongate shape along a width-wise direction of the cooking cavity at the upper portion. A support surface formed by the indentation and recessed relative to the back surface. A lighting assembly disposed in the indentation and coupled to the support surface. The support surface extends at a first oblique angle relative to the back surface and the lighting assembly is configured to project light at a second oblique angle relative to the back surface. The first oblique angle and the second oblique angle are complementary angles.

According to some aspects of the present disclosure, the lighting assembly includes at least one light source and a cover disposed between the at least one light source and the central portion. The cover has a light projection surface configured to collimate the light toward the central portion of the cooking cavity.

According to some aspects of the present disclosure, the light projection surface is configured to direct a central ray of light toward the central portion.

The embodiments described above are only intended to describe the preferred embodiments of the present device, and are not intended to limit the scope of the present device, and various embodiments of the present device may be made by those skilled in the art without departing from the spirit of the device. Modifications and improvements are intended to fall within the scope of the device as defined by the appended claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:

a cabinet defining a cooking cavity and an opening to allow access to the cooking cavity, the cabinet including a top wall and a back wall, wherein the back wall is opposite the opening and connects with the top wall at an upper portion of the back wall, the back wall having a back surface facing the cooking cavity and having a planar shape;

an indentation defined by the back wall and extending away from the cooking cavity, the indentation having an elongate shape along a width-wise direction of the cooking cavity at the upper portion;

a support surface formed by the indentation and recessed relative to the back surface, wherein the support surface extends at a first oblique angle relative to the back surface; and a lighting assembly disposed in the indentation and including at least one light source coupled to the support surface and configured to project light orthogonally relative to the first oblique angle toward a central portion of the cooking cavity, wherein the support surface extends in the width-wise direction along the back wall, and wherein the lighting assembly has an elongated shape and extends along the support surface in the width-wise direction.

2. The cooking appliance of claim 1, wherein the at least one light source is configured to project the light at a second oblique angle relative to the back surface, the first oblique angle and the second oblique angle being complementary angles.

3. The cooking appliance of claim 1, wherein the lighting assembly includes a cover disposed between the at least one light source and the central portion, the cover having a light projection surface configured to collimate the light toward the central portion of the cooking cavity.

4. The cooking appliance of claim 3, wherein the light projection surface is configured to direct a central ray of light toward the central portion, wherein the light source includes a light-emitting diode coupled to the support surface and configured to emit light orthogonal to the support surface.

5. The cooking appliance of claim 4, wherein the light includes a high-intensity range of light, and wherein the light projection surface is operable to limit the high-intensity range of light to between 45 and 90 degrees to limit light distribution toward the opening.

6. A cooking appliance comprising:

a cabinet defining a cooking cavity and an opening to allow access to the cooking cavity;

a back wall disposed opposite the opening and extending between an upper portion connecting to a top wall of the cabinet and a lower portion connecting to a bottom wall of the cabinet, wherein the back wall includes a support surface extending at a first oblique angle away from the cooking cavity; and a lighting assembly coupled to the back wall adjacent one of the upper portion and the lower portion and including at least one light source coupled to the support surface and configured to direct light at an acute angle relative to the back wall into a central portion of the cooking cavity, wherein the support surface extends in a width-wise direction along the back wall, and wherein the lighting assembly has an elongated shape and extends along the support surface in the width-wise direction.

7. The cooking appliance of claim 6, wherein the lighting assembly is adjacent the upper portion.

8. The cooking appliance of claim 6, wherein the support surface extends at an acute angle relative to the back wall of the cabinet, wherein the lighting assembly is coupled to the support surface and configured to project the light normal to the support surface.

9. The cooking appliance of claim 8, further comprising:

a protrusion extending from the back wall into the cooking cavity, wherein the protrusion forms the support surface.

10. The cooking appliance of claim 8, wherein the back wall defines a recess extending away from the cooking cavity, wherein the recess forms the support surface.

11. The cooking appliance of claim 6, wherein the at least one light source extends from adjacent a first side wall of the cabinet to adjacent a second side wall of the cabinet.

12. The cooking appliance of claim 11, wherein the at least one light source includes a plurality of light sources distributed along a width of the back wall between the first side wall and the second side wall.

13. The cooking appliance of claim 11, wherein the at least one light source includes a first light source and a second light source, wherein the first light source is disposed adjacent an intersection of the back wall, a top wall, and a first side wall of the cabinet, and wherein the second light source is disposed adjacent an intersection of the back wall, the top wall, and a second side wall of the cabinet.

14. The cooking appliance of claim 6, wherein the lighting assembly includes a light-emitting diode (LED) coupled to the support surface and configured to emit light orthogonal to the support surface.

15. The cooking appliance of claim 14, wherein the lighting assembly includes a cover having a light projection surface, wherein the light projection surface includes a planar extent that extends at an acute angle relative to the back wall and is configured to collimate the light toward the central portion of the cooking cavity.

16. The cooking appliance of claim 15, wherein the at least one light source is spaced from the cover and operable to direct a central ray of light at an acute angle relative to the planar extent.

17. A cooking appliance, comprising:

a cabinet defining a cooking cavity and an opening to allow access to the cooking cavity, the cabinet including a top wall and a back wall, wherein the back wall is opposite the opening and connects with the top wall at an upper portion of the back wall, the back wall having a back surface facing the cooking cavity and having a planar shape;

an indentation defined by the back wall and extending away from the cooking cavity, the indentation having an elongate shape along a width-wise direction of the cooking cavity at the upper portion;

a support surface formed by the indentation and recessed relative to the back surface; and a lighting assembly disposed in the indentation and coupled to the support surface, wherein the support surface extends at a first oblique angle relative to the back surface and the lighting assembly includes a light source coupled to the support surface and configured to project light at a second oblique angle relative to the back surface, the first oblique angle and the second oblique angle being complementary angles, wherein the support surface extends in the width-wise direction along the back wall, and wherein the lighting assembly has an elongated shape and extends along the support surface in the width-wise direction.

18. The cooking appliance of claim 17, wherein the lighting assembly includes a cover disposed between the at least one light source and the central portion, the cover having a light projection surface configured to collimate the light toward the central portion of the cooking cavity.

19. The cooking appliance of claim 18, wherein the light projection surface is configured to direct a central ray of light toward the central portion.

* * * * *